United States Patent [19]

Morgan et al.

[11] 3,867,281

[45] Feb. 18, 1975

[54] HYDROCONVERSION PROCESS

[75] Inventors: Barry S. Morgan, Concord; Joseph Jaffe, Berkeley, both of Calif.

[73] Assignee: Chevron Research Company, San Francisco, Calif.

[22] Filed: Aug. 1, 1973

[21] Appl. No.: 384,854

Related U.S. Application Data

[63] Continuation-in-part of Ser. No. 196,205, Nov. 5, 1971, Pat. No. 3,795,632.

[52] U.S. Cl............. 208/213, 252/455 R, 252/463, 252/465, 252/466 J
[51] Int. Cl........................ C10g 23/02, B01j 11/40
[58] Field of Search......... 208/111, 213; 252/455 R, 252/465, 466 J

[56] References Cited
UNITED STATES PATENTS

| | | | |
|---|---|---|---|
| 2,908,655 | 10/1959 | Keith | 252/465 |
| 2,964,481 | 12/1960 | Cramer et al. | 252/455 |
| 3,414,525 | 12/1968 | Michalko | 252/453 |
| 3,493,517 | 2/1970 | Jaffe | 252/437 |
| 3,530,066 | 9/1970 | Kuwata | 208/309 |
| 3,554,899 | 1/1971 | Hansford | 208/111 |
| 3,598,724 | 8/1971 | Mulaskey | 208/111 |
| 3,682,811 | 8/1972 | Mulaskey | 208/111 |

Primary Examiner—Delbert E. Gantz
Assistant Examiner—S. Berger
Attorney, Agent, or Firm—G. F. Magdeburger; R. H. Davies

[57] ABSTRACT

In a hydroconversion process wherein a hydrocarbon feedstock is contacted with solid catalyst particles prepared by forming a hydrogel and then shaping the hydrogel into a pellet, and wherein said contacting is carried out at a temperature between 400° and 900°F., and a hydrogen partial pressure between 100 and 10,000 psig, the improvement which comprises preparing said catalyst by adding to said hydrogel a catalyst fines-water mixture containing at least 10 weight percent free water and at least 80 percent total water, before the hydrogel is shaped into a pellet.

5 Claims, No Drawings

HYDROCONVERSION PROCESS

CROSS REFERENCE TO RELATED APPLICATION

This application is a continuation-in-part of application Ser. No. 196,205, filed Nov. 5, 1971, and now U.S. Patent No. 3,795,632.

BACKGROUND OF THE INVENTION

The present invention relates to improved hydroconversion processes by using improved catalysts, more particularly by using catalysts which have fine particles incorporated in the catalyst material before the catalyst material is shaped into the final catalyst pellet.

The present invention affords a process for hydrofining heavy hydrocarbon charge stocks for the primary purpose of effecting the elimination of nitrogenous and sulfurous compounds, and providing additional advantages through the removal of organometallic contaminants, and in the conversion of the pentaneinsoluble portion of such heavy hydrocarbon charge stocks into more valuable pentane-soluble hydrocarbon oils. The catalyst pellets which are formed in the process of the present invention are particularly advantageously used in hydrodesulfurization of petroleum crude oils or heavy fractions of petroleum crude oils such as atmospheric distillation column bottoms, or vacuum distillation column bottoms, or solvent deasphalted heavy oils.

Petroleum crude oils, and the heavier hydrocarbon fractions and/or distillates which may be derived therefrom, generally contain nitrogenous and sulfurous compounds in relatively large quantities. In addition, petroleum crude oil is contaminated by the inclusion therein of detrimental quantities of organometallic contaminants having the tendency to exert deleterious effects upon a catalytic composite which is employed in various processes to which the crude oil or heavy hydrocarbon fraction may be subjected. The most common metallic contaminants are nickel and vanadium, although other metals including iron, copper, etc., may be present. These metals may occur within the crude oil in a variety of forms: they may exist as metal oxides or sulfides, introduced as metallic scale or particles; they may be present in the form of soluble salts of such metals; generally, however, they exist in the form or organometallic compounds, such as metal porphyrins and various derivatives thereof. Although those metallic contaminants existing in the form of oxide and/or sulfide scale may be removed by a relatively simple washing-filtering procedure, and the water-soluble salts are at least in part removable by water-washing followed by a subsequent dehydration technique, a much more severe treatment is required to remove the organometallic compounds, and to the extent that the resulting crude oil or heavy hydrocarbon fraction becomes suitable for further, subsequent processing. In addition to the organometallic compounds, petroleum crude oils contain greater quantities of sulfurous and nitrogenous compounds that are found in the lighter hydrocarbon fractions including gasoline, kerosene, middle-distillate gas oils, etc. The nitrogenous and sulfurous compounds may be at least in part converted, on being subjected to a hydrorefining process, into hydrocarbons, ammonia, and hydrogen sulfide, the latter being readily removed from the system in a gaseous phase.

The catalyst pellets which are used in the hydroconversion process of the present invention can be prepared by various prior art means (except for the inventive features which will be discussed hereinbelow) including the aqueous gelation means as described, for instance, in J. Jaffe U.S. Pat. Nos. 3,280,040 and 3,493,517, or in Kuwata et al. U.S. Pat. No. 3,530,066. Thus, general methods of preparing hydrogels or coprecipitates are known in accordance with the prior art.

The addition of fine particles to a gel or sol, such as silica sol, has been described in patents such as U.S. Pat. Nos. 3,414,525 and 3,530,066. U.S. Pat. No. 3,414,525 relates to the addition of crystalline aluminosilicate to a silica sol before the silica sol is aged and formed into a final catalyst pellet. U.S. Pat. No. 3,530,066 is directed to making a catalyst pellet which is 85 to 99 percent fine refractory particles with 1 to 15 weight percent of alumina hydrogel. According to the '066 patent, the fine particles are obtained by drying and calcining alumina and then comminuting the alumina into particles of 20 to 100 microns in size. These dried fine particles are added to a very small portion of alumina hydrogel, and this mixture is kneaded and then shaped into a catalyst particle having pore sizes of 1,000 to 50,000 Angstroms.

SUMMARY OF THE INVENTION

It is important in the process of the present invention to add the catalyst fines as a catalyst fines-water mixture. Thus, the process of the present invention differs from prior art processes suggesting the addition of dry fines to hydrogel material before the gel material is shaped into a catalyst pellet.

The present invention is based largely on our finding that the use of the catalyst pellets obtained in accordance with the present invention shows surprisingly high activity and also surprisingly low fouling rates in hydroconversion service, particularly in hydrodesulfurization of heavy oils such as crude oil atmospheric distillation column bottoms, vacuum distillation column bottoms, or deasphalted heavy oils.

In general, the hydroconversion operating conditions for which catalysts prepared in accordance with the present invention are to be used are as follows:

| | |
|---|---|
| Temperature | 400 to 900°F.; |
| Pressure | 100 to 20,000 psig; |
| Hydrogen Feed Rate | typically 500 to 10,000 s.c.f./bbl. of oil feed, although the catalyst of the present invention can also be used in (autofining) operations; |
| Liquid Hourly Space Velocity | 0.1 to 10.0 |

Use of a catalyst in accordance with the present invention gives unexpected advantages in hydroconversion processes, particularly hydrodesulfurization processes, compared to the use of prior art catalysts. In accordance with the present invention, the hydroconversion catalysts are prepared by a method which comprises:

a. forming a hydrogel comprising alumina, silica, or alumina-silica precursors;

b. adding to said hydrogel a catalyst fines-water mixture containing at least 10 weight percent free water and at least 80 weight percent total water before the hydrogel is shaped into a pellet;

c. removing excess water from the hydrogel-catalyst fines mixture; and d. shaping the hydrogel with the added catalyst fines into a pellet.

It is particularly preferred to shape the hydroconversion catalyst by extrusion, for example, extruding the gel mixture through a die with an opening of about one thirty-second to one-fourth inch in diameter.

It should be understood that in the present specification the term "catalyst pellet" may be used to mean catalysts formed by a pelleting or compression method on dried catalyst powders, but preferably is used in a broad sense to cover catalyst formed by extrusion and agglomeration of wet mixtures, and to distinguish the final catalyst from the sometimes very tiny particles which make up the final catalyst pellet.

The term "hydrogel" is also used in a broad sense to include shapeless precipitates and true all-embracing solid gels. Thus, in general, the term "hydrogel" is used to include precipitates, which may be in slurry or filter cake form, of one or more of the material which are the catalyst pellet precursors. The catalyst pellets used in the process of the present invention preferably comprise alumina, silica, or alumina-silica. The catalyst pellets used in the present invention also preferably comprise one or more hydrogenation components such as Group VIB and/or Group VIII metals, usually in the oxide, sulfide or clemental form. Typical hydrogenation components thus comprise Ni, Co, Pd, Mo and W.

The term "catalyst fines" is used herein to mean fine solid particles. Particularly preferred are fine particles which are obtained by grinding up or otherwise finely dividing various waste materials from various points in the catalyst manufacturing procedure, said points being after at least a catalyst precursor gel has been formed such as an alumina precursor. It is most preferable to employ as said catalyst fines waste material obtained from a point in the catalyst manufacturing procedure after all the catalyst precursors are present in the catalyst materials as, for example, waste material from an extrusion step, or from a drying step, or from a calcining step. Preferably, the size of the catalyst fines is less than 1,000 microns in diameter, and more preferably less than 50 microns in diameter. Particularly preferred size range for the catalyst fines is 0.1 to 30 microns in diameter.

The amount of water in the catalyst fines-water mixture recycled to the basic catalyst precipitate material should be at least 10 weight percent free water and at least 80 percent total water. More preferably, the free water is at least about 50 weight percent. Usually sufficient water is used to make an easily handleable slurry as if one were making a slurry of clay with water.

EXAMPLES

EXAMPLE 1

Catalyst A is a hydrogel coprecipitate of the type disclosed and claimed in J. Jaffe U.S. Patent No. 3,493,517. Composition is:

| | |
|---|---|
| NiO | 10.2% |
| $MoO_3$ | 30.0% |
| $Al_2O_3$ | 43.3% |
| $TiO_2$ | 10.0% |
| $P_2O_5$ | 6.5% |
| | 100.0% |

Through adjustment of drying and calcining conditions, a catalyst particle area of 284 $m^2/cc$ was obtained with average micropore diameter = 100 Angstroms.

The average micropore diameter was calculated by dividing the pore volume (cc/g) by the surface area ($m^2/g$) and multiplying by 40,000.

EXAMPLE 2

Catalyst B was prepared similarly as Catalyst A, with the exception that 50 percent of the final catalyst was comprised of finely pulverized catalyst powder obtained from an air attrition mill ("micronizer"). The dried catalyst fines were uniformly distributed by intensive mulling into the wet hydrogel matrix. The mixture was extruded, dried and calcined by conventional means. Catalyst particle area was 237 $m^2/cc$ with average pore diameter = 110 Angstroms.

EXAMPLE 3

Catalysts A and B were compared for desulfurization of a heavy Arabian atmospheric residuum of inspections:

| | |
|---|---|
| Gravity, °API | 12.8 |
| Sulfur, wt. % | 4.3 |
| Nitrogen, ppm | 3,060 |
| Asphaltenes, wt. % | 11.4 |
| Ni/V, ppm | 25/77 |

Conditions were:

| | |
|---|---|
| 1.0 | LHSV |
| 1.0% | Sulfur in product |
| 1900 | psig pressure |
| 10,000 | s.c.f./b $H_2$ gas rate |
| 750 | hours testing |

From the tests the activity (starting temperatures) and fouling rates were:

| | | |
|---|---|---|
| Catalyst A: | 726°F., | 0.02°F./Hr. |
| Catalyst B: | 724°F., | 0.04°F./Hr. |

Thus it is seen that the inital catalyst activities were similar, but that Catalyst B, containing recycled dried fines, was not as stable as Catalyst A.

EXAMPLE 4

Catalyst C was another preparation of Catalyst A, which through adjustment of drying and calcining conditions had a particle surface area of 353 $m^2/cc$ with average micropore diameter = 86 Angstroms.

EXAMPLE 5

Catalyst D was prepared by identical processing as Catalyst C, with the exception that 15 percent wet ground fines was added to the hydrogel prior to further processing. The fines were prepared in a 5 percent solids-water slurry by passing dried catalyst and water through a Manton Gaulin homogenizing pump. The ground fines slurry was mixed with virgin precipitated catalyst gel slurry, which was subsequently filtered and worked up into finished catalyst. Particle surface area of the finished catalyst was 348 $m^2/cc$ with average micropore diameter = 85 Angstroms.

EXAMPLE 6

Catalysts C and D were compared for desulfurization of an Arabian vacuum gas oil of inspections:

| | | |
|---|---|---|
| Gravity, °API | | 24.7 |
| Sulfur, wt. % | | 2.4 |
| Nitrogen, ppm | | 816 |

Conditions were:

| | |
|---|---|
| LHSV | 2.4 |
| Sulfur in product | 0.2 |
| psig Pressure | 550 |
| s.c.f./b $H_2$ gas rate | 2400 |

From the tests the starting temperatures and fouling rates were:

| | | |
|---|---|---|
| Catalyst C: | 732°F., | 0.058°F./Hr. |
| Catalyst D: | 734°F., | 0.02 °F./Hr. |

The improved stability of Catalyst D, containing recycled wet fines, is readily apparent from the above data. The fouling rate for the catalyst with the recycled wet fines (Catalyst D) was about one-third that for the catalyst with no fines (Catalyst C).

EXAMPLE 7

Catalysts B and D were compared for hydrodesulfurization of two similar Arabian vacuum gas oils of inspections:

| | Feed for Catalyst D Test Run | Feed for Catalyst B Test Run |
|---|---|---|
| Gravity, °API | 24.7 | 22.6 |
| Sulfur, wt. % | 2.4 | 2.5 |
| Nitrogen, ppm | 816 | 793 |
| | Catalyst D Test Run | Catalyst B Test Run |
| Conditions were: | | |
| LHSV | 2.4 | 2.4 |
| Sulfur in product | 0.2 | 0.2 |
| psig Pressure | 550 | 450 |
| s.c.f./b $H_2$ gas rate | 2400 | 2400 |

From the tests the starting temperatures and fouling rates were:

| | | | Normalized to 550 psig pressure for both test runs: | |
|---|---|---|---|---|
| Catalyst B: | 750°F., | 0.09°F./Hr. | 731°F. | 0.067°F./Hr. |
| Catalyst D: | 734°F., | 0.02°F./Hr. | 734°F., | 0.02 °F./Hr. |

The improved stability of Catalyst D, containing recycled wet (as opposed to dry) fines, is readily apparent from the above data. The fouling rate for the catalyst with the recycled wet fines (Catalyst D) was less than one-third that for the catalyst with the recycled dry fines (Catalyst B). The test data for Catalyst B was obtained at a slightly lower pressure (450 psig) than the pressure (550 psig) used for the vacuum gas oil run with Catalyst D. However, the results of the two runs were made directly comparable by normalization to a test pressure of 550 psig. The normalization calculation was based on a well-established correlation.

Although various embodiments of the invention have been described, it is to be understood that they are meant to be illustrative only and not limiting. Certain features may be changed without departing from the spirit or scope of the present invention. It is apparent that the present invention has broad application to hydroconversion processes using catalyst pellets prepared by the addition of a fine particles-water mixture to catalyst precursor precipitate followed by shaping of the catalyst particle. Accordingly, the invention is not to be construed as limited to the specific embodiments or examples discussed, but only as defined in the appended claims or substantial equivalents of the claims.

What is claimed is:

1. In a hydroconversion process wherein a hydrocarbon feedstock is contacted with solid catalyst particles prepared by forming a hydrogel and then shaping the hydrogel into a pellet, and wherein said contacting is carried out at a temperature between 400° and 900°F., and a hydrogen partial pressure between 100 and 10,000 psig, the improvement which comprises using as said catalyst a catalyst prepared by steps comprising adding to said hydrogel a catalyst fines-water mixture containing at least 10 weight percent free water and at least 80 percent total water, before the hydrogel is shaped into a pellet.

2. A process in accordance with claim 1, wherein the hydrogel comprises an alumina precursor.

3. A process in accordance with claim 1, wherein the hydrogel comprises a silica precursor.

4. A process in accordance with claim 1, wherein the hydrogel comprises alumina-silica precursors.

5. A process in accordance with claim 1, wherein a sulfur containing feedstock is treated under hydrodesulfurization condition.

* * * * *

PO-1050
(5/69)

UNITED STATES PATENT OFFICE
CERTIFICATE OF CORRECTION

Patent No. 3,867,281  Dated February 18, 1975

Inventor(s) Barry S. Morgan and Joseph Jaffe

It is certified that error appears in the above-identified patent and that said Letters Patent are hereby corrected as shown below:

Col. 1, line 59, "that" should read --than--.

Col. 5, line 11, the following should be added:
--Catalysts C and D were of the same catalyst "pellet" size and were both shaped by extrusion.--

Col. 5, line 40, the following should be added:
--Catalysts B and D were of the same catalyst "pellet" size and were both shaped by extrusion.--

Signed and Sealed this seventh Day of October 1975

[SEAL]

Attest:

RUTH C. MASON
Attesting Officer

C. MARSHALL DANN
Commissioner of Patents and Trademarks